United States Patent [19]

Stickney

[11] 4,363,588
[45] Dec. 14, 1982

[54] REFUSE HANDLING SYSTEM

[76] Inventor: Arwood D. Stickney, 225 S. Davis St., Missoula, Mont. 59801

[21] Appl. No.: 167,658

[22] Filed: Jul. 11, 1980

[51] Int. Cl.³ ............................................. B65F 3/00
[52] U.S. Cl. ................................... 414/408; 414/411
[58] Field of Search .............. 414/408, 424, 422, 406, 414/407, 409, 411, 420, 501, 525 R, 607, 608, 680; 220/1.5; 232/43.5, 43.1

[56] References Cited

U.S. PATENT DOCUMENTS

| | | | |
|---|---|---|---|
| 2,730,252 | 1/1956 | Oswalt | 414/411 |
| 2,730,253 | 1/1956 | Oswalt | 414/411 |
| 3,270,902 | 9/1966 | Breault | 414/406 |
| 3,597,927 | 8/1971 | Hemphill | 414/501 X |
| 3,662,910 | 5/1972 | Herpich et al. | 414/406 |
| 3,687,317 | 8/1972 | Gagel | 414/411 |

*Primary Examiner*—John J. Love
*Assistant Examiner*—L. E. Williams
*Attorney, Agent, or Firm*—Wells, St. John & Roberts

[57] ABSTRACT

A refuse handling system including a portable refuse container with a side opening wall. A latching mechanism is provided on the container to lock the wall closed when the container is resting on the ground surface but that is released to unlock and permit the wall to be opened after the container has been lifted from the ground. The latching mechanism is unlocked by a cylinder operator on the fork loader of a refuse vehicle. The unlocking mechanism on the forks is operated as the container is lifted and tipped rearwardly. The refuse will then fall freely from the open container onto a conveyor at the forward end of the refuse vehicle.

8 Claims, 5 Drawing Figures

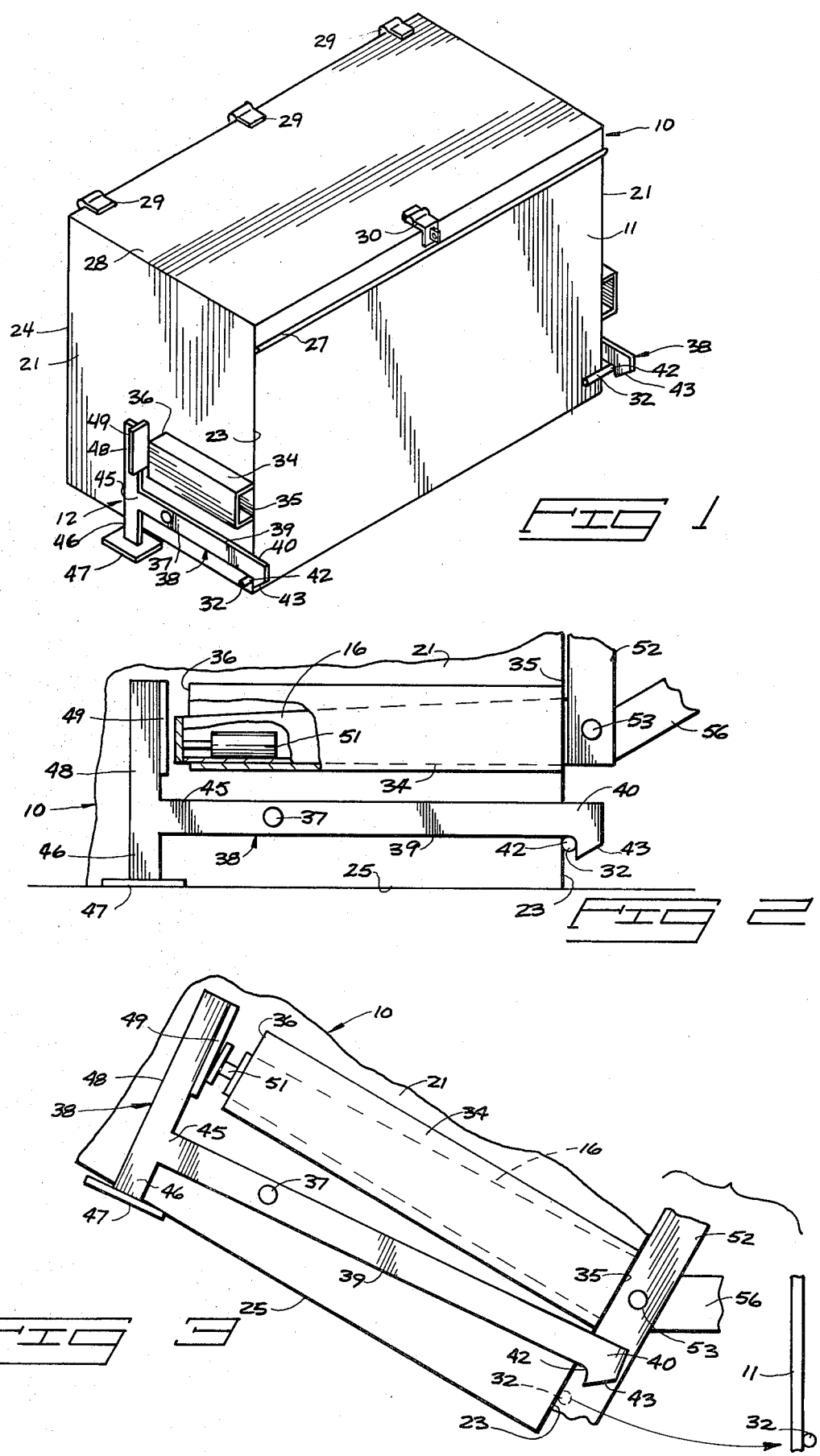

REFUSE HANDLING SYSTEM

BACKGROUND OF THE INVENTION

The present invention is related to refuse handling systems, particularly to those using covered refuse containers that are picked up and dumped by a front loader having fork arms.

Most modern refuse pickup systems make use of a number of portable containers at selected sites and collection trucks that include a mechanism by which the containers are lifted and dumped into a compactor or box on the truck. These systems provide more efficient solid waste handling than older, manual systems, but are not without drawbacks.

Nearly all "front loading" refuse collecting vehicles have a fork arm assembly used to hoist top opening containers over the operator's cab. These same arms tilt the lifed container to dump the contents into the truck box behind the cab. Hydraulic systems are generally employed for these purposes. A complete hoist-dump-return cycle is tediously slow. Certain dangers are also involved in hoisting the container over the cab, overhead wires being the most prevalent.

It therefore becomes desirable to obtain some form of improved refuse handling system that facilitates a short, safe, emptying cycle.

U.S. Pat. No. 3,597,927 discloses a method and apparatus for disposing of refuse using a front loading primary collection vehicle. The vehicle has lateral unloading mechanisms leading to opposite sides of the cab front. Each lateral unloading mechanism has a container lifting apparatus that engages the containers and tips them upwardly to dump contents on lateral conveyors. The lateral conveyors empty onto a central longitudinal conveyor leading from the truck front rearwardly to the box. The containers involved are mounted to relatively stationary, leg-supported bases. The containers are bottomless, the bottom closing wall being part of the stationary base. The unloading mechanisms pull the bottomless containers horizontally from their stationary supports and tip them up over the lateral conveyors. The vehicle must be located precisely relative to the container in order to prevent the bottomless container from being emptied before it is located above a lateral conveyor. The several conveying mechanisms and unloading apparatus and substantially to the overall cost and maintenance of the entire system. Furthermore, the relatively movable container and base present further complications and increased maintenance.

U.S. Pat. Nos. 2,730,253 and 2,730,252 to Oswald disclose containers having side opening doors that swing about an upper axis in which the lower edge is latched. When the container is moved to an elevated position, the latch can be released to enable the container materials to be dumped through the side door. The Oswald containers are described with specific reference to use as fruit storage boxes and are designed for lifting and emptying by specially designed loader arms that are mountable to a tractor. A mechanical linkage is also provided along the fork arms for manual operation by the tractor operator to latch or unlatch the side opening door.

The present refuse collection system includes a container that, unlike the Oswald containers, is provided specifically for receiving and emptying refuse material in direct association with a front loading refuse truck. It includes a side opening door and latch mechanism that locks the door in a closed position when the container is resting on the ground surface. The unlatching and latching mechanism is operated simply by producing a horizontal force against an upwardly projecting plate, causing the latch to disengage from a latch pin on the door. This is preferably accomplished by small hydraulic cylinders that can be mounted to existing front loader arms.

BRIEF DESCRIPTION OF THE DRAWINGS

FIG. 1 is a pictorial view of the present container;

FIG. 2 is an enlarged fragmentary view of the portion of the present container and engaged fork arms of a front loading vehicle;

FIG. 3 is a view similar to FIG. 2 only showing a different operational position of the components shown therein;

DETAILED DESCRIPTION OF A PREFERRED EMBODIMENT

Figure 4:
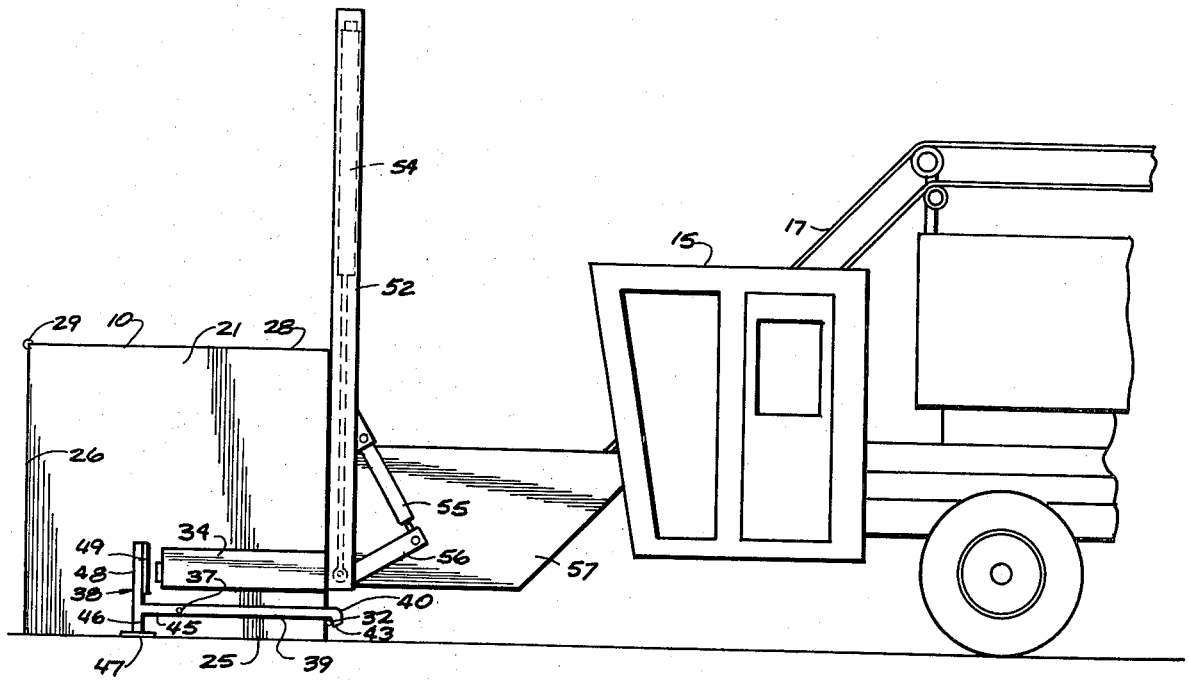
FIG. 4 is a view illustrating a portion of a front loading vehicle and the present container wherein the container is resting on the ground surface.

The present system is made up generally of a container 10 having a side opening wall 11 selectively secured by a latch mechanism 38. The container is provided for location at a refuse disposal site and is designed to be periodically emptied by a refuse vehicle 15. Such vehicle includes front end loader forks 16 adapted to engage and lift the container 10. It also includes mechanisms for unlocking the latch mechanism 12, tipping the container upwardly, and allowing the front side opening wall 11 to fall open. Refuse within the container will then fall freely from the container onto a conveyor system 17. The system 17 functions to move the received refuse to a vehicle storage box (not shown). The present system facilitates emptying of the container 10 without elevating the container beyond the vehicle operator's cab 18.

The container is shown in substantial detail by FIGS. 1 through 3. It includes upright, transversely spaced end walls 21 joined along bottom edges thereof to a horizontal bottom wall 25. The end walls 21 each include upright front edges 23 and rear edges 24. The rear edges 24 are connected by a rear wall 26 that is also fixed to the bottom wall 25. Walls 21, 25, and 26 are preferably rigidly connected and can be fixed to one another by any appropriate means, such as welding, riveting, etc.

The front side opening wall 11 spans the front edges 23 of the end walls 21. It is hinged at 27 about a hinge axis that is spaced upwardly from the bottom wall 25. The front wall is movable about the hinge axis to a closed position (FIGS. 1 and 2) wherein the wall 11 engages the bottom wall and upright front edges 23. The front side opening wall 11 can also swing about the hinge axis to an open position (FIGS. 3 and 5) where wall 1 is clear of the bottom wall 25 and projects outwardly from the end walls 21.

A channel means 34 is provided at each end wall 21 adjacent the bottom wall 25. The channel means 34 is simply comprised of elongated longitudinal channels leading from front open ends 35 to open rear ends 36. Channel means 34 is used to receive the loader forks 16.

The top of container 10 is selectively covered by a lid 28. The lid 28 may be hinged at 29 to either the rear wall 26, as shown, or to any of the remaining walls. A hasp 30 for a removable lock (not shown) can be used to secure the container against unauthorized use.

A latch pin 32 is secured to the front side opening wall 11 at each end thereof. The pins 32 are situated adjacent to the bottom edge across wall 11 and project transversely outward beyond the respective end walls 21. The latch pins 32 are used in conjunction with a rigid latch means 38 to allow selective opening and closing of the front side opening wall 11.

Figure 5:
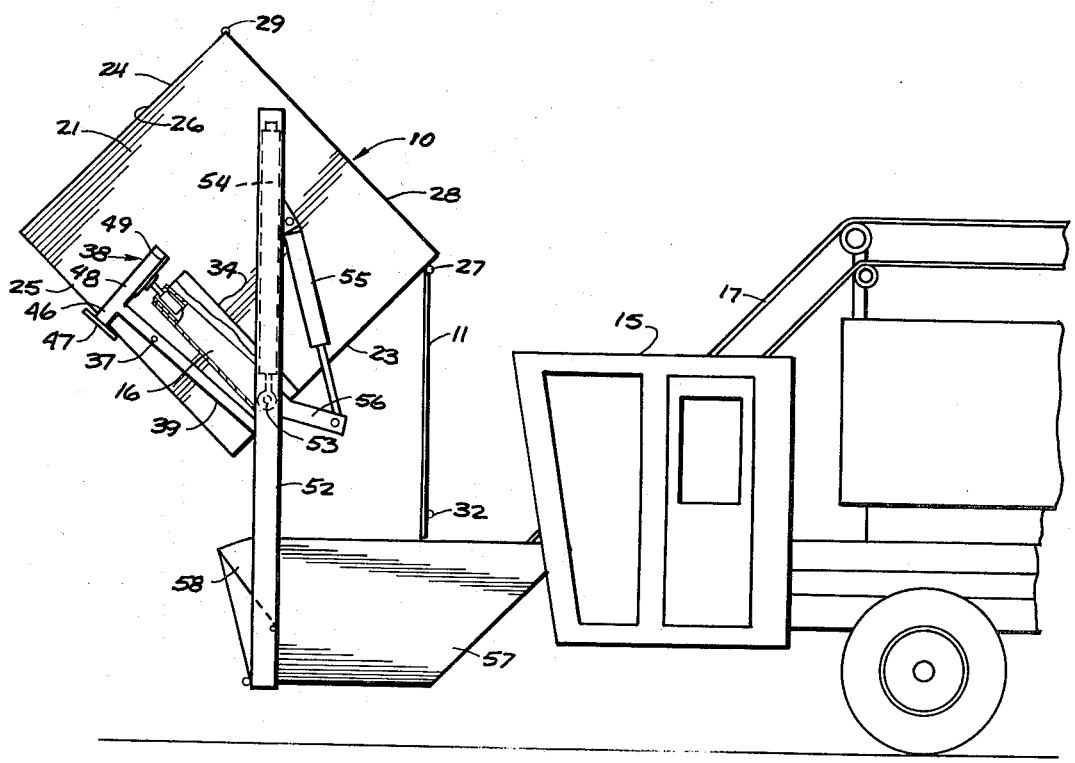
FIG. 5 is a view similar to FIG. 4 only showing the container lifted and tipped to an unloading orientation.

The latch means 32 is shown in detail by FIGS. 2 and 3 and in operation in FIGS. 4 and 5. The latch means functions to alternately secure and release the front side opening wall 11 relative to the remainder of the container 10. Latch means 38 is pivoted relative to the container about a transverse latch axis defined by pivot pins 37. The transverse axes of pins 37 are coaxial and substantially parallel to the axis of hinge 27.

The latch means 38 includes a pair of rigid bars 39 extending longitudinally along the opposed end walls 21. The bars 39 each include front ends 40 that project toward the wall 11 and include downwardly facing hooks 42 engageable with the latch pins 32. Inclined cam surfaces 43 lead to the hooks 42. The latch pins cam against the bars, causing pivotal movement thereof until the hooks 42 can fall into place over the pins 32.

The bars 39 include rearward ends 45 that are spaced to opposite sides of the latching axis from front ends 40. The rear ends 45 include downwardly oriented projections 46 that rigidly mount a flat bottom surface 47. The bottom surface 47 is normally situated below the bottom wall 25 so it will engage the ground or other support surface and cause pivotal, downward movement of the front bar ends 40, hooking the latch pins 32 as the container is lowered to the ground surface. Once the container is lifted from the ground surface, the bottom surface 47 is free to move downward about the latch axis.

Each bar 39 also includes an upright projection 48 mounting an upright surface 49. Surface 49 is adapted to span the open rearward end 36 of the adjacent longitudinally open channel means 34. The upright surfaces 49 are located on bars 39 for selective engagement by an actuator means on loader forks 16. Such engagement will cause downward and rearward pivotal movement of the surfaces 49 and result in corresponding upward pivotal movement of the hooks.

The actuator means is preferably comprised of a pair of hydraulic cylinders 51 mounted at the outside ends of loader forks 16. The cylinder bodies may be secured to the forks while the pistons and pushing surfaces mounted thereto are horizontally movable. The actuator means can be connected to the hydraulic system available on the refuse vehicle 15, and can be supplied with appropriate operator controls (not shown).

The vehicle 15 is shown in somewhat simplified form in FIGS. 4 and 5. It includes lifting means with upright guides 52 that movably support the forks 16. Pins 53 are provided to connect the forks to a lifting cylinder 54 on each of the guides. Elevating cylinders 54 within the guides can extend, lowering the forks (FIG. 4) or retract, lifting the forks vertically (FIG. 5). Cylinders 55 are also mounted to each fork. Cylinders 55 extend from their sliding mount on the guides 52 to outwardly projecting cranks 56 on the forks. Extension of the tilting cylinders 55 cause the forks to pivot upwardly about the pins 53. This causes corresponding tilting of an engaged container 10. Conversely, retraction of the cylinder 55 will cause pivotal movement of the forks to the normal horizontal orientation.

The upright guides 52 straddle a hopper 57 used to receive refuse dumped from the container 10. The hopper preferably has closed sides and an open top. It preferably includes a foldable apron 58 situated at a leading side to prevent refuse from falling or being blown away from the hopper as the container is being dumped. The folding apron 58 is mounted by a hinge (not shown) to the hopper and will pivot clear of the container as it is moved between the FIGS. 2 and 4 storage position to the FIGS. 3 and 5 dumping position.

The present system may make use of several of the containers 10 situated at different locations, resting on the ground or other support surface as a central receptacle for refuse. The vehicle 15 can be moved from one container to the other in an emptying cycle in which the individual containers are emptied and repositioned at their original resting places.

Refuse is dumped into the initially empty container 10, using the lid 28. Unauthorized access to the container is assured through provision of the hasp 30 and an appropriate locking mechanism.

The side opening wall 11 cannot open when the container rests on the ground surface due to the locking arrangement provided by the latch means 38. The weight of the container 10 pressing against the bottom surface 47 of the bars 39 causes the hooked front ends 40 to remain engaged with the latch pins 32. The latch means cannot be released unless the entire container is lifted from the support surface.

For loading purposes the vehicle is positioned directly in front of the container 10 as shown in FIGS. 4 and 5. The vehicle is maneuvered so the front loader forks 16 are received longitudinally within the channel means 34. The vehicle is moved forwardly until the outer ends of the loader forks 16 project beyond the open rear ends 36 of the channel means. This positions the actuator cylinders 51 for direct engagement with the upright surface 49. The front side opening wall 11 is then situated closely adjacent to the hopper 56.

Once the vehicle is properly positioned with the container 10 and the forks 16 have been received through the channel means 34, the elevating cylinder 54 can be actuated to hoist the container directly upwardly. As this happens, the weight of the container is lifted from the bottom surfaces 47 of the latch means. The latch means is therefore free to be pivoted from engagement with the latch pins 32. This is accomplished by selective operation of the actuator means. The cylinders 51 will extend, engaging the upright surfaces 49 to cause upward pivotal movement of the hooks 42 about the latching axis. This step is performed after the bottom wall of the container has been elevated above apron 58. The cylinders 55 are also operated at this time to tip the container to an unloading position as shown in FIG. 5. The front side opening wall 11 will then swing open and the container contents will fall from the container into the hopper 56.

When the container is empty, the cylinders 55 can be actuated to retract, pivoting the container back to its normal horizontal orientation. The front opening wall 11 will swing back into abutment with the upright front side edges 23 and bottom wall 25, bringing the latch pins 32 into the arcuate path of the hooks 42. The elevating cylinders 54 can then be actuated to lower the container back to the support surface. The bottom surfaces 47 of the latch means are first to engage the ground surface. The weight of the container on the bottom surfaces 47 causes the hooks 42 to pivot downwardly into engagement with the latch pins 32. The front side opening wall 11 is thereby locked in its closed position and the container is ready for refilling.

The above operation takes very little time in comparison to the same emptying procedure for standard top opening containers where the refuse vehicle must hoist the container over the operator's cab to be dumped. Furthermore, the elevation of the container at the dumping position is substantially lower than the elevation of previous containers that must be moved over the operator's cab. There is therefore substantially less danger of entanglement with overhead wires or other obstructions. Another advantage is that the operator is in full view of the entire dumping procedure without the need of mirrors or additional personnel to watch the operation.

The above description and attached drawings set forth a preferred form of the present invention. Other forms and modifications of the invention may fall within the scope of the following claims.

What I claim is:

1. In a refuse handling system including a container and a refuse vehicle having power operated fork lift arms for handling the container, comprising:

wherein the refuse container includes a pair of transversely spaced end walls fixed along lower edges to a bottom wall and presenting front and rear upright edges;

a rear wall fixed across the bottom wall and spanning the rear edges of said end walls;

a front wall spanning the front edges of said end walls and pivoted to them about a transverse hinge axis spaced upwardly from said bottom wall, said front wall being movable between a closed position in engagement with the bottom wall and the front upright edges of the end walls, and an open position projecting outward from said edges;

a latch pin fixed to the movable front wall at one side of the container and at a location below said hinge axis;

rigid latch means pivotally mounted to the end wall at said one side of the container, said latch means being pivotal relative to the container about a transverse latch axis;

said latch means having front and rear opposed ends extending to opposite sides of the latch axis, the front ends of said latch means presenting a downwardly open hook;

the front end of said latch means being pivotable between a first position with the hook overlapping the location of the latch pin when the front wall is in its closed position and a second position with the hook clear of such location;

the rear end of said latch means having a bottom surface formed thereon for engagement with the support surface on which the container rests for storage purposes for maintaining the front end of the latch means in said first position until the container is elevated from the support surface;

an upright surface fixed to the rear end of the latch means;

wherein the vehicle includes actuating means mounted to a forklift arm for selectively engaging and pivoting the latch means to the second position;

said latch means comprising:

a rigid bar mounted outward of said end wall in a substantially horizontal position and having a front end and a rear end;

a pivot connection intermediate the front and rear end of said bar and defining said latch axis; and the rear end of the bar having an upwardly protruding projection presenting said upright surface and a downwardly protruding projection presenting said bottom surface.

2. The system as claimed by claim 1 wherein the actuating means is comprised of a hydraulic cylinder mounted to said forklift arm with its piston shaft having a push plate mounted thereon for engagement with said upright surface.

3. The system as claimed by claim 1, further comprising: longitudinally open channel means fixed to the outer surfaces of each container end wall at an elevation above said latch means and including front and rear longitudinal rear openings for receiving the lifting forklift arms.

4. The system as claimed by claim 1 further comprising upright lifting means mounting the forklift arms for elevating the forklift arms vertically for hoisting an engaged container vertically to a dumping position.

5. The system as claimed by claim 1 further comprising fork pivot cylinders movably mounted to the lifting means for pivoting the forklift arms about a transverse axis and tipping a container on the arms to a dumping position.

6. The system as claimed by claim 5 further comprising a hopper on the vehicle adjacent the forklift arms for receiving contents of a container.

7. A refuse container adapted to rest on a support surface for storage purposes and adapted to be elevated from the support surface for dumping purposes, said container comprising:

a pair of transversely spaced end walls fixed along lower edges to a bottom wall and presenting front and rear upright edges;

a rear wall fixed across the bottom wall and spanning the rear edges of said end walls;

a front wall spanning the front edges of said end walls and pivoted to them about a transverse hinge axis spaced upwardly from said bottom wall, said front wall being movable between a closed position in engagement with the bottom wall and the front upright edges of the end walls, and an open position projecting outward from said edges;

a latch pin fixed to the movable front wall at one side of the container and at a location below said hinge axis;

rigid latch means mounted outward of the end wall at said one side of the container in a substantially horizontal position and having front and rear ends;

a pivot connection intermediate the front and rear ends of the latch means and defining a transverse latch axis;

the front end of said latch means presenting an open hook pivotal about said latch axis between a first position with the hook overlapping the latch pin when the front wall is in its closed position, and a second position with the hook clear of said location;

the rear end of said latch means having an upwardly protruding projection and a downwardly protruding projection including a bottom surface formed thereon for engagement with the support surface on which the container rests for storage purposes for maintaining the front end of the latch means in said first position until the container is elevated from the support surface.

8. A refuse container adapted to rest on a support surface for storage purposes and adapted to be elevated from the support surface for dumping purposes, said container comprising:

a pair of transversely spaced end walls fixed along lower edges to a bottom wall and presenting front and rear upright edges;

a rear wall fixed across the bottom wall and spanning the rear edges of said end walls;

a front wall spanning the front edges of said end walls and pivoted to them about a transverse hinge axis spaced upwardly from said bottom wall, said front wall being movable between a closed position in engagement with the bottom wall and the front upright edges of the end walls, and an open position projecting outward from said edges;

a latch pin at each side of the movable front wall at a location below said hinge axis;

rigid latch means pivotally mounted to each of the end walls, said latch means being pivotal relative to the container about a transverse latch axis;

said latch means having front and rear opposed ends extending to opposite sides of the latch axis, the front ends of said latch means presenting downwardly open hooks;

the front ends of said latch means being pivotable between a first position with the hooks overlapping the respective locations of the latch pins when the front wall is in its closed position, and a second position with the hooks clear of such location;

the rear ends of said latch means having bottom surfaces formed thereon for engagement with the support surface on which the container rests during its storage usage for maintaining the front ends of the latch means in said first position until the container is elevated from the support surface;

longitudinally open channel means fixed to the outer surface of each end wall at an elevation above said latch means and including front and rear longitudinal openings for receiving lifting forks used to elevate the container;

upright surfaces fixed to the respective rear ends of the latch means and projecting across the rear longitudinal openings of the adjacent channel means;

said latch means comprising:

rigid bars mounted outward of the end walls in a substantially horizontal position and having front ends and rear ends;

a pivot connection intermediate the front and rear end of each bar and defining said latch axis; and the rear end of each bar having an upwardly protruding projection presenting said upright surface and a downwardly protruding projection presenting said bottom surface.

* * * * *